United States Patent
Mathews et al.

(10) Patent No.: US 11,003,524 B2
(45) Date of Patent: May 11, 2021

(54) DATA STORAGE SYSTEM WITH REPAIR OF VIRTUAL DATA BLOCKS OF INTERNAL FILE SYSTEM

(71) Applicant: EMC IP Holding Company LLC, Hopkinton, MA (US)

(72) Inventors: Alexander S. Mathews, Morganville, NJ (US); Rohit K. Chawla, Scotch Plains, NJ (US); Dixitkumar Patel, Monroe, NJ (US); Soumyadeep Sen, Highland Park, NJ (US); Kumari Bijayalaxmi Nanda, Edison, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 118 days.

(21) Appl. No.: 16/399,044

(22) Filed: Apr. 30, 2019

(65) Prior Publication Data

US 2020/0348998 A1 Nov. 5, 2020

(51) Int. Cl.
*G06F 11/07* (2006.01)

(52) U.S. Cl.
CPC ...... *G06F 11/0793* (2013.01); *G06F 11/0727* (2013.01); *G06F 2201/815* (2013.01); *G06F 2201/84* (2013.01)

(58) Field of Classification Search
CPC ............ G06F 11/0793; G06F 11/0727; G06F 11/1435; G06F 2201/815; G06F 2201/84
See application file for complete search history.

(56) References Cited

U.S. PATENT DOCUMENTS

| | | | |
|---|---|---|---|
| 6,973,556 B2 * | 12/2005 | Milligan | G06F 16/2329 |
| | | | 711/202 |
| 7,475,277 B1 | 1/2009 | Holdman et al. | |
| 7,546,319 B1 | 6/2009 | Srinivasan et al. | |
| 7,730,277 B1 * | 6/2010 | Prakash | G06F 3/067 |
| | | | 711/170 |
| 7,945,726 B2 | 5/2011 | Faibish et al. | |
| 8,843,533 B1 | 9/2014 | Sukumar et al. | |
| 9,020,987 B1 * | 4/2015 | Nanda | G06F 16/1734 |
| | | | 707/821 |
| 9,547,659 B1 * | 1/2017 | Barber | G06F 16/2358 |
| 2009/0271659 A1 | 10/2009 | Troppens et al. | |

FOREIGN PATENT DOCUMENTS

WO 2010050944 5/2010

* cited by examiner

*Primary Examiner* — Joseph R Kudirka
(74) *Attorney, Agent, or Firm* — BainwoodHuang

(57) ABSTRACT

A method of repairing an indirect addressing structure of a file system damaged by corruption of a virtual data block (VDB) mapping data stored in corresponding physical data blocks (PDBs) includes scanning PDB descriptors to identify PDBs storing data mapped by the corrupted VDB, where each identified PDB includes a set of PDB entries each having a backward pointer identifying a corresponding VDB entry of a corresponding VDB. The identified PDBs are scanned to identify PDB entries whose backward pointers refer to VDB entries of the corrupted VDB, then a replacement VDB is created by (1) for each of the identified PDB entries, recreating a corresponding VDB entry including a forward pointer to the identified PDB entry, and (2) incorporating the recreated VDB entries into the replacement VDB. The replacement VDB is then incorporated into the indirect addressing structure in place of the corrupted VDB.

20 Claims, 6 Drawing Sheets

DATA STORAGE SYSTEM WITH REPAIR OF VIRTUAL DATA BLOCKS OF INTERNAL FILE SYSTEM

BACKGROUND

The present invention relates to the field of file systems, in particular to large file systems used in data storage systems for organizing storage the data of logical storage objects such as volumes. Even more particularly, it relates to techniques for repairing damage to an indirect addressing tree of the file system that occurs during operation.

SUMMARY

A method is disclosed of repairing an indirect addressing structure of a file system that has been damaged by corruption of a virtual data block (VDB) that provides a lowest-level mapping of file system data stored in corresponding physical data blocks (PDBs). The method includes scanning PDB descriptors to identify PDBs storing file system data mapped by the corrupted VDB, where each identified PDB includes a set of PDB entries each having a corresponding backward pointer identifying a corresponding VDB entry of a corresponding VDB. The identified PDBs are scanned to identify PDB entries whose backward pointers refer to VDB entries of the corrupted VDB, then a replacement VDB is created by (1) for each of the identified PDB entries, recreating a corresponding VDB entry including a forward pointer to the identified PDB entry, and (2) incorporating the recreated VDB entries into the replacement VDB. The replacement VDB is then incorporated into the indirect addressing structure in place of the corrupted VDB.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
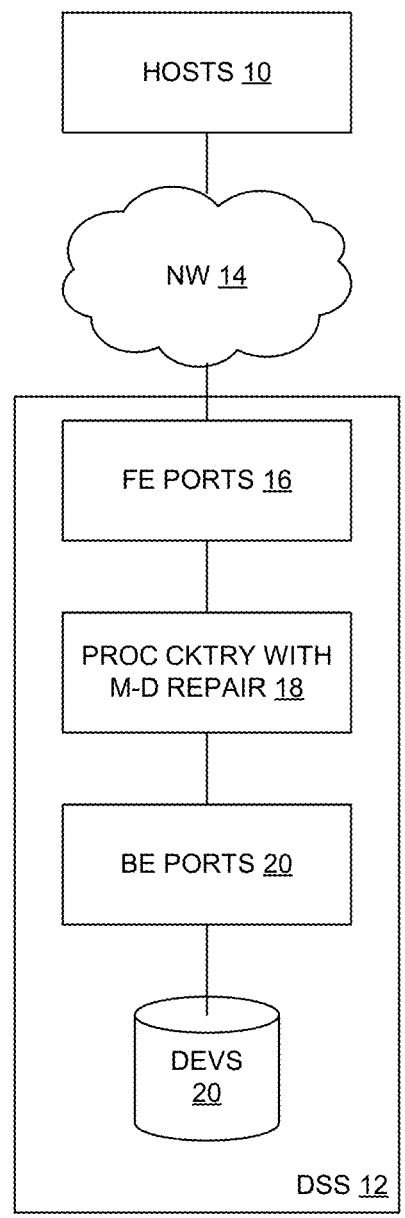
FIG. 1 is a block diagram of a data processing system including a data storage system employing a technique of repairing VDB page corruption as described herein.

In a global file system (FS) forming part of a logical mapper in a data storage system, logical pages called IDP Pages maintain information to track shared blocks among storage volumes in the same family (e.g., LUNs, snapshots and thin clones). Since the scope of the FS is global and there could be sharing of blocks within/across families because of de-duplication, it can be challenging to reduce the scope of metadata check and repair to an isolated portion of the mapper tree structure. Due to the large size of the file system, the large scope makes the metadata check and repair slow, unwieldy and inefficient.

Described herein is a technique in which certain additional metadata is maintained in an on-disk mapping structure, and mechanisms use the metadata to perform more targeted check and repair working with a reduced portion of the mapping tree. By this technique, certain block-sharing related metadata corruptions can be isolated for repair, making the repair process more efficient and leaving remaining portions of the tree usable and avoiding the need to take the entire mapper offline.

In particular, the technique relates to repair of corruption to certain pages called virtual data blocks (VDBs) that reside at the lowest level of the mapping tree and provide a level of indirection to sets of physical data blocks (PDBs) where file system data is actually stored. In one embodiment each PDB is a 2 MB data block. For normal operation, entries of a VDB have pointers to corresponding entries of a PDB, enabling address-based traversal of the tree to obtain data. For purposes of repair as described herein, each PDB entry also maintains a "back pointer" pointing to the associated VDB entry(ies) that point to the PDB entry. This back pointer provides a basis for the repair operation.

In one embodiment a PDB descriptor (PDB Desc) for a PDB already contains back pointers to VDBs associated with the PDB. The back-pointer usage is extended to have back pointers to each VDB entry of a VDB from each data segment (compressed or uncompressed) of the associated PDB. The back pointer is set during the data write to the PDB. The back pointer would only change when the data is moved to a different PDB, for example as part of "hole plugging" or garbage collection operations. For such cases, it may be useful to also include a sequence number in each VDB entry in order to break ties. The sequence number is incremented whenever a VDB is updated to point to a different PDB.

The repair operation is initiated upon discovery of a corrupted VDB, for example during normal processing of a read or write operation. Each VDB preferably includes a checksum or other checking mechanism so that corruption can be identified. The address of the corrupted VDB is passed to the targeted check and repair from the normal access path. The following describes the repair steps in one embodiment:

1. Scan all the PDB Desc pages to find the PDBs having reference to the corrupted VDB. In a large file system there could be millions of such descriptors to be scanned.

2. For each matching PDB Desc, scan the corresponding PDB looking at each of the back pointer headers to find the entries that refer to the corrupt VDB.

3. For each matching header in the PDB, rebuild the corresponding entries in the corrupted VDB. The sequence number can be used to identify the most up-to-date VDB-PDB association, so that only that back pointer is used and out-of-date back pointers are ignored.

4. The VDB entries may also maintain reference counts of references from higher-level Leaf IDP pages, which are handled separately. Fixing the reference counts requires a scan of all the Leaf IDP pages, to find all the references to the VDB entries that correspond to the corrupt VDB page. Scanning of all the Leaf IDP pages can be done as a regulated background process to fix the reference counts in this VDB completely. Until the background processing is done, the VDB can be marked with a specific state to indicate its rebuilding process. Any normal-path accesses to this VDB can be prevented by checking the state.

Embodiments

FIG. 1 shows a data processing system 10 in which a plurality of host computers (HOSTS) 10 access secondary storage provided by a data storage system (DSS) 12 via a network 14. As shown, the data storage system 12 includes front-end interface circuitry or ports (FE PORTS) 16, processing circuitry (PROC CKTRY) 18, back-end interface circuitry or ports (BE PORTS) 20 and secondary-storage devices (DEVs) 22. The processing circuitry 18 includes particular functionality for repairing metadata (M-D) of an internal file system, as described more herein.

In operation, the hosts 10 issue secondary storage data requests (reads, writes) for data stored on the devices 20. These requests are generally referred to as "I/O requests" herein. The I/O requests are communicated from the hosts 10 to respective ports 16 of the DSS 12 by the network 14. The processing circuitry 18 processes each I/O request and returns an appropriate response. In the case of reads, the response generally includes the requested data (absent a failure or other abnormal condition), and for writes the data is written to respective drives 20 and a "write complete" response is returned. The processing circuitry 18 may maintain and utilize a semiconductor "device cache" to cache selected data of the drives 20, as generally known in the art. Thus read data may come from the cache (for a hit) or from a device 20 (cache miss). For a write, the write data may be stored into the cache initially, then later de-staged to a device 20.

Figure 2:
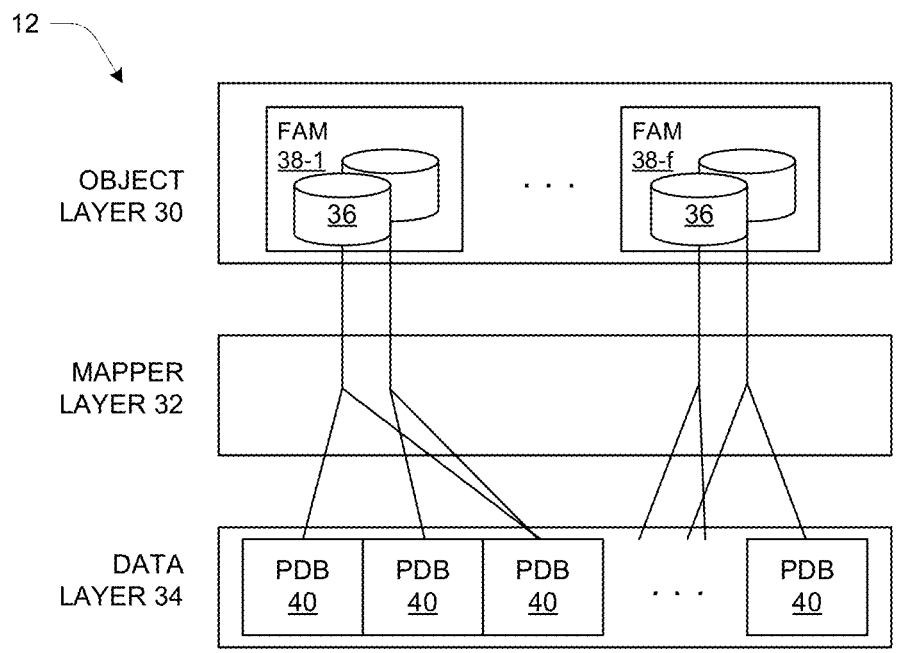
FIG. 2 is a logical/functional block diagram of the data storage system.

FIG. 2 is a functional/logical view of certain aspects of the data storage system 12. It will be appreciated that much of the functionality is realized by software executed by the processing circuitry 18, apart from the physical storage of data which is provided by the devices 20. In the view of FIG. 2 there are three functional layers—an object layer 30, a mapper layer 32 and a data layer 34. These are described in turn.

The object layer 30 establishes and maintains logical views of the secondary storage that are referred to as volumes 36, and presents the volumes 36 to the hosts 10 (FIG. 1) as the objects of storage operations (e.g., reads and writes). The volumes 36 are organized into families 38 (shown as FAM 38-1, . . . , FAM 38-f). In one embodiment, the volumes 36 of a family 38 include a current or "primary" volume 36 and a collection of point-in-time copies of that primary volume, referred to as "snapshot" volumes 36 (or simply "snapshots" or "snaps"). A given snapshot is obtained from an existing version of the primary volume, which may either the primary volume itself or another snapshot that was obtained earlier. In this description, the term "source" is used to identify the volume whose snapshot was taken to obtain a snapshot volume 36.

The data layer 34 maintains the actual data for the volumes 36, as respective collections of physical data blocks (PDBs) 40. As explained more below, the PDBs 40 are data blocks of an internal file system of the mapper layer 32. In one embodiment the PDBs 40 are of a fixed size such as 2 MB, and include additional sub-structure as described below. In this case a PDB may contain up to 512 uncompressed 4 KB pages of data. Other structures are possible. The PDBs 40 may be stored in any of a variety of ways on a set of nonvolatile secondary storage media, such as magnetic media, flash-programmable semiconductor media (Flash), etc. Moreover, there may be additional layers of logical structure that translate between the PDB-view of the data and actual physical storage as provided by physical storage devices. For example, in one embodiment, raw physical storage provided by storage devices may be carved into large extents from which are served block-sized units for allocation to the volumes 36 and storage of the corresponding data. Such lower-level details are outside the scope of the present description.

The mapper layer 32 is responsible for translating between the logical-volume view of the object layer 30 and the PDB structuring of the data layer 34. As shown in simplified form, each volume 36 is mapped to a corresponding collection of PDBs 40 by the mapper layer 32. As also simply illustrated, in some cases a given PDB 40 may belong to more than one volume 36, i.e., the mapper layer 32 may map logical data blocks of multiple volumes 36 to the same PDB 40. This feature is referred to as "block sharing" herein, and is used in support of snapshot functionality, for example. For snapshotting, rather than completely duplicating the entirety of a source volume 36, a snapshot volume 36 can be organized primarily as a logical structure with block storage for only those blocks that are modified or in addition to the blocks of the source (where "source" refers to the volume 36 whose snapshot is being taken). The mapping for a snapshot volume 36 points to the same PDBs 40 as the source volume 36 for all original, unmodified blocks. It also has pointers to other PDBs 40 that store the snapshot version of source blocks that have been modified or deleted from the source during ongoing operation.

The mapper layer 32 also provides additional logic in support of services such as data compression and deduplication, which generally rely on data sharing at a finer grain. This additional logic is described below.

Figure 3:
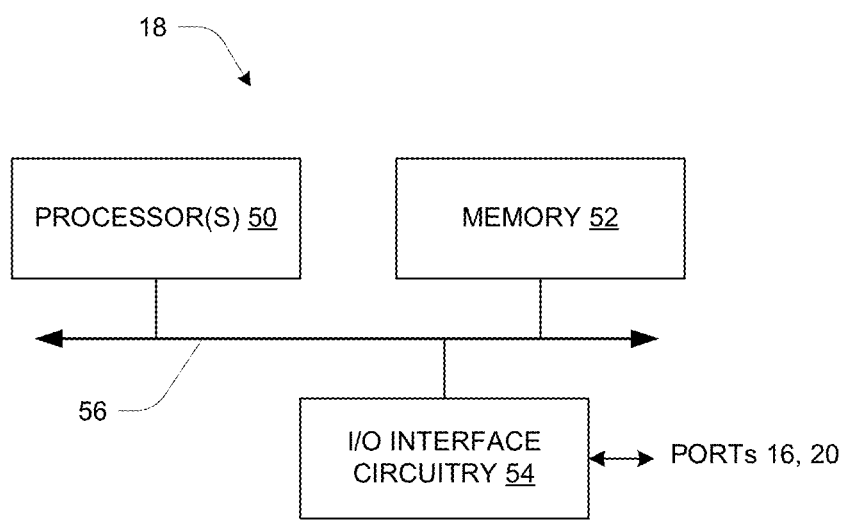
FIG. 3 is a block diagram of processing circuitry from a hardware perspective.

FIG. 3 shows an example configuration of the processing circuitry 18 from a computer hardware perspective. The hardware includes one or more processors 50, memory 52, and interface circuitry 54 interconnected by data interconnections 56 such as one or more high-speed data buses. The interface circuitry 54 provides hardware connections to the ports 16, 20 (FIG. 1) and perhaps other external devices/connections. The processor(s) 50 with connected memory 52 may also be referred to as "processing circuitry" herein. In operation, the memory 52 stores data and instructions of system software (e.g., operating system) and one or more application programs which are executed by the processor(s) 50 to cause the hardware to function in a software-defined manner. The application software may be stored on a non-transitory computer-readable medium such as an optical or magnetic disk, Flash memory or other non-volatile semiconductor memory, etc., from which it is retrieved for execution by the processing circuitry, as generally known in the art.

Figure 4:
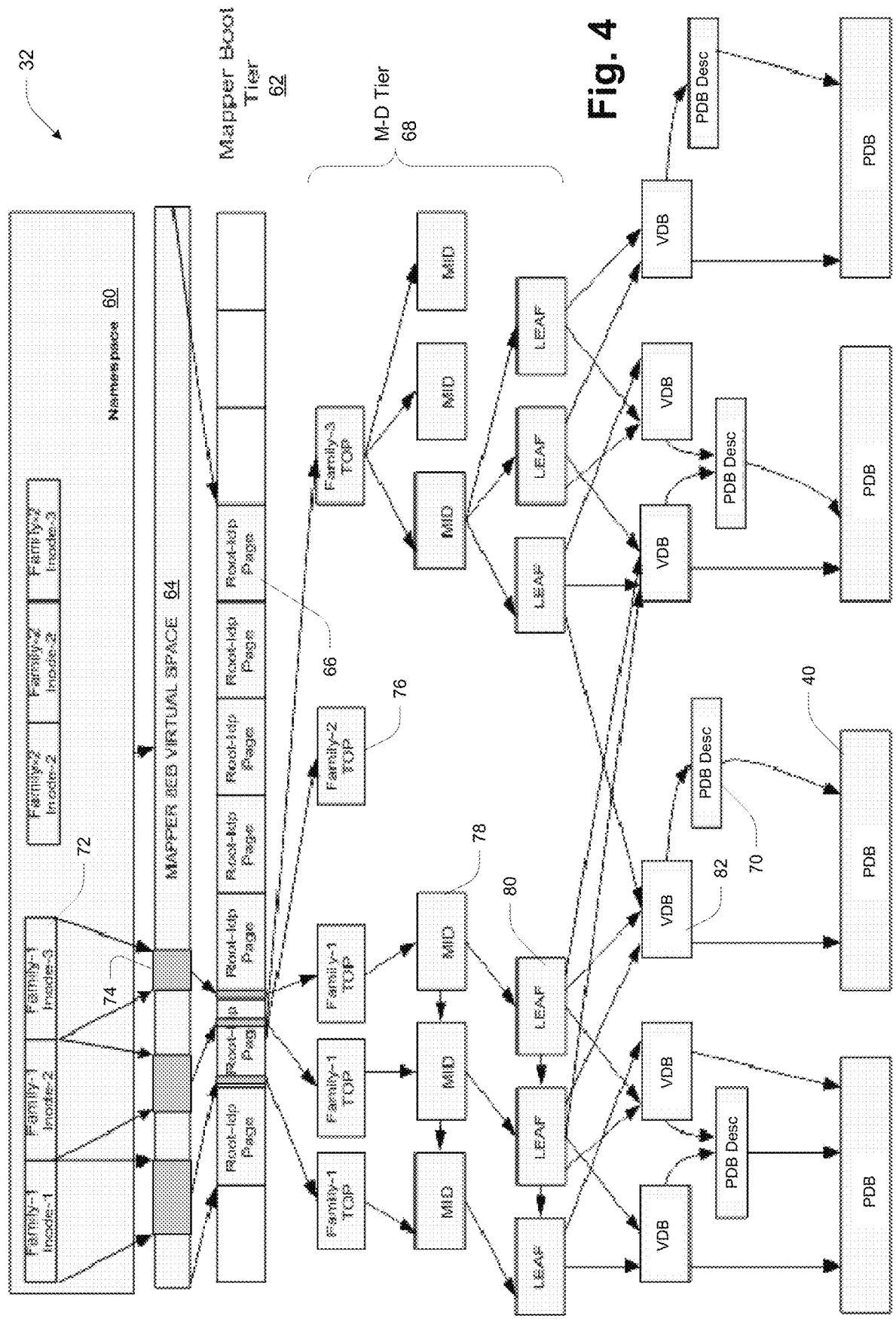
FIG. 4 is a schematic diagram of a mapper file system.

FIG. 4 illustrates details of the mapper layer 32, which is structured as a file system. At a high level it is organized into a namespace 60, a mapper boot tier 62 which has a large virtual address space 64 (e.g., 8 EB (exabytes)) and a set of Root-Idp pages 66, and a metadata (M-D) tier 68. Also shown are the PDBs 40 of the data layer, along with associated PDB descriptors (Desc) 70. The namespace layer 60 includes modes 72 that map abstract volume identifiers to corresponding extents 74 of the virtual space 64. Each mode 74 corresponds to a respective volume 36 (FIG. 3), and the modes 74 are grouped into families (e.g., Family 1 and Family 2) as shown. The extents 74 are mapped to corresponding sets of PDBs 40 by the remaining structure, as described further below after a brief description of FIG. 5.

Figure 5:
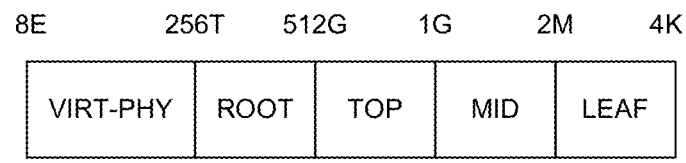
FIG. 5 is a schematic diagram of virtual address segmentation in the file system.

FIG. 5 illustrates a logical segmentation of the virtual address space 64 as expressed in the structure of FIG. 4. A block address is segmented into distinct portions shown as leaf, mid, top, root and virt-phy, from least to most significant, where all but the virt-phy cover regions that are successive multiples of 512 in size. A given leaf value (leaf offset) identifies a single 4 KB block in a specific 2 MB range; a given mid value identifies a single 2 MB sub-range of a specific 1 GB range, and so on. At the highest level, a virtual-to-physical (virt-phy) mapping maps a given extent 74 to a specific 256 TB range as well as to one or more 512 GB sub-regions thereof, as explained more below.

Returning to FIG. 4, the address structure of FIG. 5 is reflected in the structure of the mapper boot tier 62 and metadata tier 68. The Root-Idp pages 66 have 512 pointers each, as do the top-level pages (TOP) 76, mid-level pages (MID) 78, and leaf pages (LEAF) 80. Starting at the upper level, individual extents 74 which correspond to modes 72 are mapped to corresponding sets of Root-Idp pointers of the Root-Idp pages 66, where each Root-Idp pointer points to a respective top-level (TOP) page 76. This mapping is the virtual-to-physical mapping discussed above, and is indicated in FIG. 4 as a set of arrows between the virtual space 64 and the mapper boot tier 62. Because of this relatively coarse mapping of an extent 74, each volume 36 as a practical matter is constrained to have a size that is a multiple of 512 GB (the region size mapped by a TOP 76). In alternative embodiments, other structure may be used to provide finer or coarser size resolution as may be desired.

Proceeding downward, each TOP 76 has up to 512 pointers to respective MIDs 78; and each MID 78 has up to 512 pointers pointing to respective LEAFs 80. The LEAFs 80 have pointers to virtual data blocks (VDBs) 82 and entries thereof, as explained more below. The VDBs 82 provide a level of indirection between the lowest-level mapping of the LEAFS 80 and the PDBs 40 storing the actual data. This indirection provides support for services such as data compression and de-duplication, as explained more below. As shown, a VDB 82 also points to the PDB descriptor 70 of the PDB 40 to which the VDB 82 points. Additionally, the PDB descriptor 70 preferably includes a back-pointer pointing back to the associated VDB 82, for purposes of repair/recovery as described below.

In operation, a data request is directed to a particular volume 36 and range of logical addresses thereof, also referred to as "offsets". To access volume data, an mode 72 is selected based on the identity of the volume being accessed. The mode selection results in identification of the associated extent 74 and a set of entries (pointers) of a corresponding Root-Idp page 66. For a volume of less than 512 GB, the ROOT and TOP address segments together specify a particular TOP 76 and MID 78. Larger volumes may have multiple Root-Idp pointers identifying multiple MIDs 78. The MID address segment specifies an individual pointer in a MID 78 that points to a corresponding LEAF 80, and similarly the LEAF address segment specifies a specific VDB 82 and the PDB 40 to which it points, as well as individual VDB and PDB entries. Additional aspects of operation are described below.

All of the structure of FIG. 4 is so-called "on-disk" structure, i.e., stored persistently on the same non-volatile storage media that constitutes the devices 20 (FIG. 1). At any given time, some of this structure may be resident in system memory to promote faster operation. There may be an in-memory "metadata cache" for caching such in-memory portions of the structure, and various functions and rules for managing the metadata cache to optimize performance and robustness/resilience. Such techniques are generally known and not elaborated herein.

Figure 6:
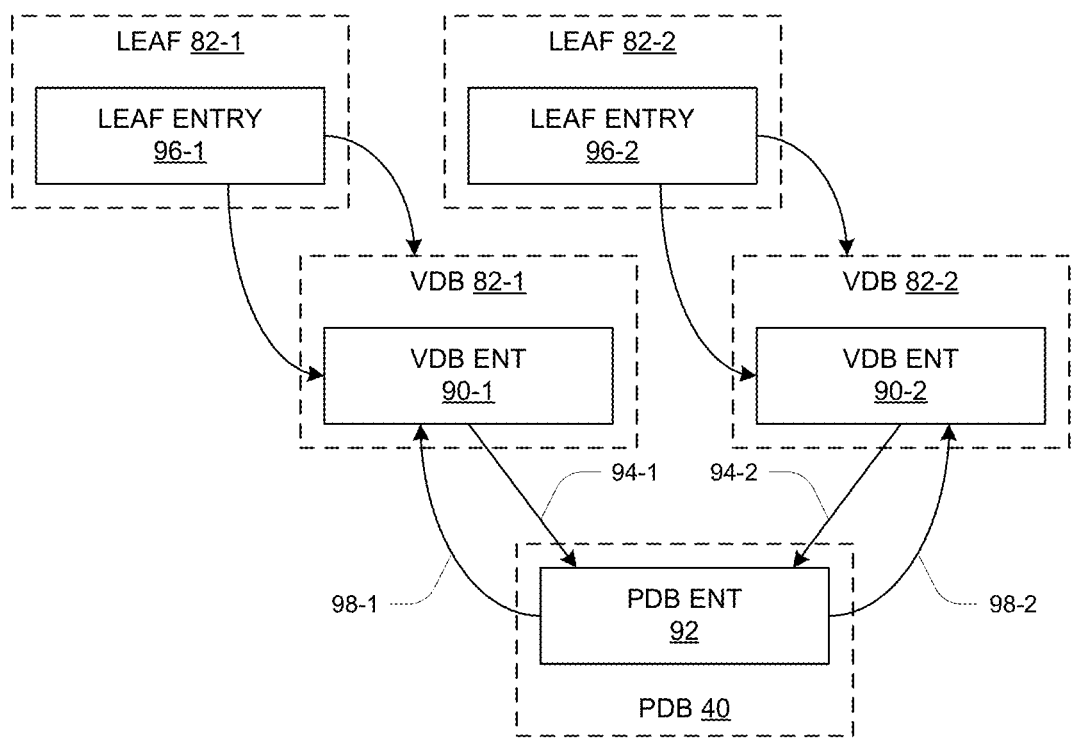
FIG. 6 is a schematic diagram illustrating relationships among leaf pages, VDBs, and PDBs in file system.

FIG. 6 illustrates certain structure and operation at the level of the VDBs 82 and PDBs 40. In this simplified example, two VDBs 82-1, 82-2 point to a single PDB 40 as well as its associated PDB Descriptor 70 (FIG. 4). Each VDB 82 contains a respective set of VDB entries 90, each pointing to a respective PDB entry 92 of the PDB 40. These are shown as forward pointers 94. Also shown is the reference from a leaf entry 96 of a leaf page 80—each leaf entry 96 points to a given VDB 82 as well as to an individual VDB entry 90 thereof. Each PDB entry 92 also points back (via backward pointers 98) to the associated VDB entries. The forward pointers 94 are used for normal operation, using address bits to find the associated data to satisfy a request. The backward pointers 98 are used for a metadata rebuilding process performed in response to erroneous operating condition, as described more below.

The VDB and PDB structure is used in support of data deduplication and/or data compression. Data deduplication is supported by enabling multiple VDB entries 90 to point to the same PDB entry 92. Data compression is supported by each PDB entry 92 containing a variable-length quantity of data resulting from compression, by a compression algorithm, of a standard-size fixed-length quantity of data. Thus for example a 4 KB block of data may be compressed to a size of something less than 1 KB. This variable-length chunk is stored in a PDB entry 92, and the associated VDB entry 90 identifies both the location of the PDB entry 92 in the PDB 40 as well as the length (e.g., a length less than 1 KB in this example).

A given VDB entry 90 contains a reference count that tracks the number of deduplication references from the respective Leaf IDP pages 80 that point to it. There is a limit to the number of references a given VDB entry 90 can have. The VDB entry 90 also contains an offset and length for the data that it refers to in the corresponding PDB 40, as already described. In the case of compression, the length will be less than 4 KB. An identifier of the compression type is also stored within the VDB 82, and therefore applies to all VDB entries 90 therein.

Figure 7:
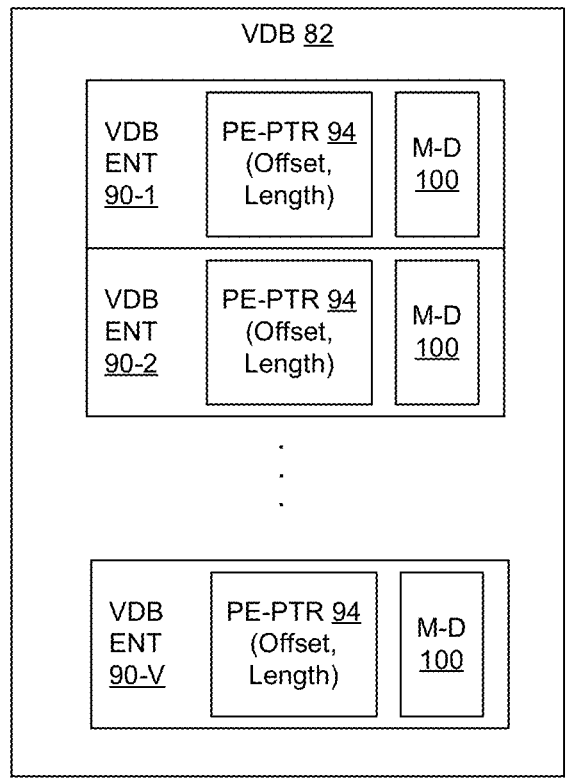
FIGS. 7 and 8 are schematic diagrams of the structures of VDBs and PDBs respectively.
Figure 8:
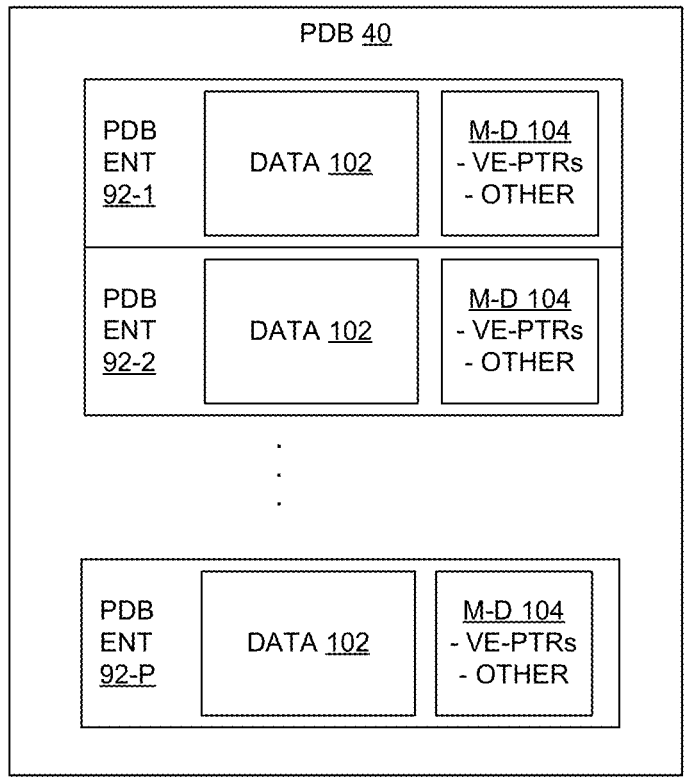

FIGS. 7 and 8 illustrate structure of the VDBs 82 and PDBs 40 in more detail. The VDB entries (VDB ENT) 90 and PDB entries (PDB ENT) 92 are shown. Each VDB entry 90 includes a PDB-entry pointer (PE-PTR) 94 in the form of a starting offset and length for an extent of data in the corresponding PDB 40. Each VDB entry 90 also includes other metadata (M-D) 100. Each PDB entry 92 includes the corresponding extent of data 102 along with metadata (M-D) 104, which includes the VDB-entry pointers (VE-PTRs) 98 (FIG. 6) as well as other metadata. The data 102 is actual file system data stored in this PDB 40 and mapped by the structure of FIG. 4 as explained above.

Figure 9:
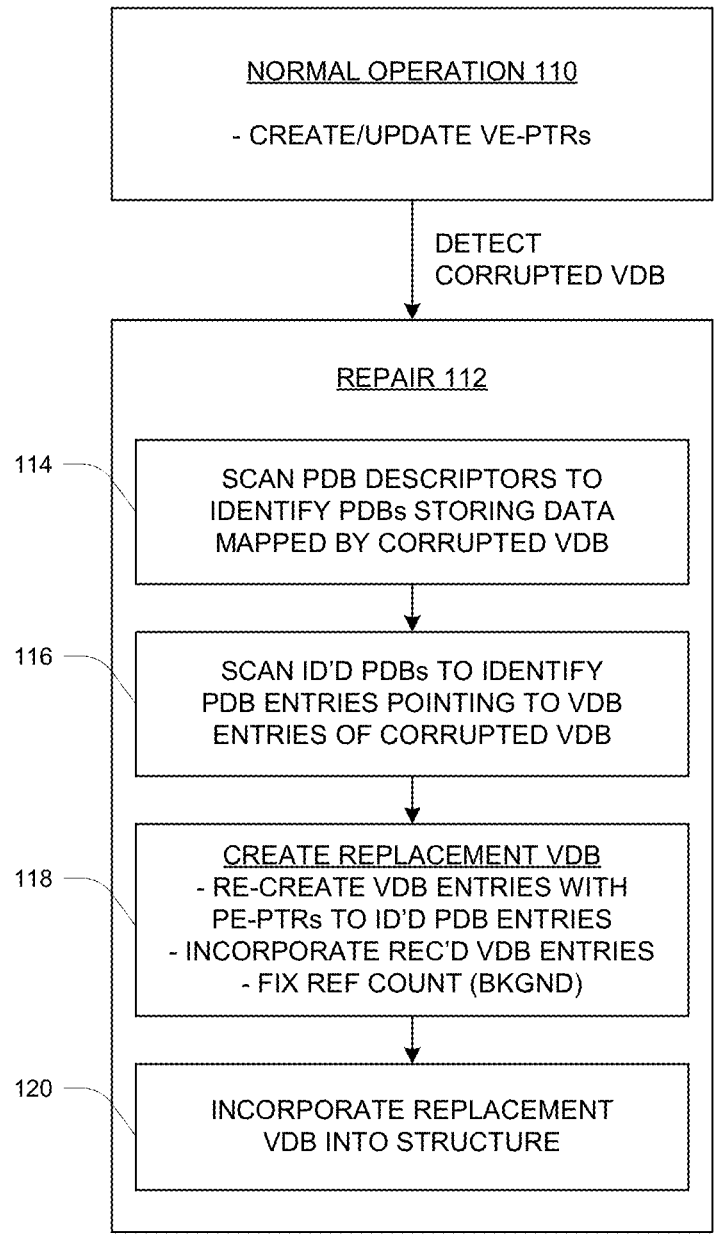
FIG. 9 is a flow diagram of pertinent operation including a metadata repair operation.

FIG. 9 illustrates pertinent operation including the repair process that has been mentioned above. At 110, normal operation occurs in which the data storage system 12 processes host I/O requests by writing/reading data to/from the devices 20. In these operations the data storage system 12 both uses and maintains the file-system structure (FIG. 4) of the mapper layer 32. In particular, as PDBs 40 are created or modified, the VE-PTRs 96 are added to PDB entries 92, identifying the corresponding VDB entries 90.

A repair operation 112 is initiated upon detecting a corrupted VDB 82 during the normal operation 110. Here the term "corrupted" signifies any condition that makes the VDB 82 unusable for normal operation. True data corruption may have occurred, i.e., an erroneous modification of its contents, or other conditions may have somehow made the VDB 82 inaccessible or otherwise unusable.

At 112 is the repair operation for repairing the indirect addressing structure (FIG. 4) that has been damaged by corruption of a VDB.

In a first step 114, all PDB descriptors 70 are scanned to identify PDBs 40 that store file system data mapped by the corrupted VDB 82, based on the back-pointers of the PDB descriptors 70 as mentioned above. Each identified PDB 40 includes a set of PDB entries 92 each having a corresponding backward pointer 98 that identifies a corresponding VDB entry 90 of a corresponding VDB 82. In general, a given PDB 40 may be pointed to by multiple VDBs 82, and thus the set of all PDB entries 92 from these identified PDBs 40 will be referenced from multiple VDBs 82 including both the corrupted VDB 82 as well as undamaged VDBs 82.

At 116, the PDBs 40 identified in step 114 are scanned to identify those PDB entries 92 whose backward pointers 98 refer to VDB entries 90 of the corrupted VDB 82 specifically.

At 118, a replacement VDB 82 is created by (1) for each of the PDB entries 92 identified in step 116, recreating a corresponding VDB entry 90 including a forward pointer 94 to the identified PDB entry 92, and (2) incorporating the recreated VDB entries 92 into the replacement VDB 82.

At 120, the replacement VDB 82 is incorporated into the indirect addressing structure (FIG. 4) in place of the corrupted VDB 82. This step includes updating the associated leaf entries 96 (FIG. 6) to point to the replacement VDB 82 instead of the corrupted VDB 82.

As mentioned above, the VDB entries 90 may also maintain reference counts of references from the Leaf pages 80, and these must also be recreated and incorporated into the replacement VDB 82. Fixing the reference counts requires a scan of all the Leaf pages 80 to find all the references to the VDB entries 90 that correspond to the corrupt VDB 82. Scanning of all the Leaf pages 80 can be done as a regulated background process to completely fix the reference counts in the replacement VDB 82. Until the background processing is done, the replacement VDB 82 can be marked with a specific state to indicate its rebuilding process. Any normal-path accesses to the replacement VDB 82 can be prevented by checking the state.

While various embodiments of the invention have been particularly shown and described, it will be understood by those skilled in the art that various changes in form and details may be made therein without departing from the scope of the invention as defined by the appended claims.

What is claimed is:

1. A method of repairing an indirect addressing structure of a file system that has been damaged by corruption of a virtual data block (VDB) providing indirection for file system data stored in corresponding physical data blocks (PDBs), comprising:
    scanning PDB descriptors to identify PDBs storing file system data mapped by the corrupted VDB, each identified PDB including a set of PDB entries, each PDB entry having a corresponding backward pointer identifying a corresponding VDB entry of a corresponding VDB;
    scanning the identified PDBs to identify PDB entries whose respective backward pointers refer to VDB entries of the corrupted VDB;
    creating a replacement VDB by (1) for each of the identified PDB entries, recreating a corresponding VDB entry including a forward pointer to the identified PDB entry, and (2) incorporating the recreated VDB entries into the replacement VDB; and
    incorporating the replacement VDB into the indirect addressing structure in place of the corrupted VDB.

2. The method of claim 1, wherein the repairing method is initiated from normal operation in which a data storage system processes host I/O requests by writing/reading data to/from storage devices, the repairing method being initiated upon detection of the corruption of the VDB, the normal operation both using and maintaining the indirect addressing structure by, as PDBs are created or modified, adding the backward pointers to the PDB entries to identify the corresponding VDB entries.

3. The method of claim 1, used in support of data deduplication or data compression, data deduplication being supported by enabling multiple VDB entries to point to the same PDB entry, data compression being supported by each PDB entry containing a variable-length quantity of data resulting from compression by a compression algorithm of a standard-size fixed-length quantity of data.

4. The method of claim 3, wherein the forward pointer of each VDB entry contains an offset and a length, the offset identifying the position of the associated PDB entry in the corresponding PDB, the length identifying the data size of the associated PDB entry.

5. The method of claim 1, wherein the corrupted VDB and replacement VDB are arranged between the PDBs and a multi-layer indirect addressing structure that maps a large virtual address space of the file system to the data stored in the PDBs.

6. The method of claim 5, wherein the corrupted VDB and replacement VDB are pointed to by respective leaf pages storing collections of indirect pointers at a lowest level of the multi-layer indirect addressing structure, and wherein selected leaf pages are pointed to by multiple higher-level mapping pages to realize block sharing for snapshot functionality.

7. The method of claim 1, wherein the VDB entries also maintain reference counts of references from respective leaf pages, and the method includes recreating the reference counts for the corrupted VDB including scanning of the leaf pages to find all references to the VDB entries that correspond to the corrupted VDB.

8. The method of claim 7, wherein the scanning of the leaf pages is done as a regulated background process to fix the reference counts of the corrupted VDB completely, and wherein, until the regulated background process is done, the replacement VDB is marked with a specific state to indicate its rebuilding process, and any normal-path accesses to the replacement VDB are prevented by checking the specific state.

9. The method of claim 1, wherein the file system is part of a data storage system providing storage of a large number of logical storage objects presented to external host computers as storage volumes, and wherein the indirect addressing structure is used to map a large virtual space in which the storage objects are defined to corresponding sets of PDBs providing physical data storage.

10. The method of claim 1, wherein the corresponding backward pointer of a given PDB entry is changed only when the data of the given PDB entry is moved to a different PDB as part of hole plugging or garbage collection operations, and wherein each VDB entry includes a sequence number used to identify a most up-to-date VDB, the sequence number being incremented whenever a VDB is updated to point to a different PDB.

11. A data storage system having processing circuitry defining and using an internal file system, the processing circuitry being configured and operative to store and execute computer program instructions to perform a method of repairing an indirect addressing structure of the file system that has been damaged by corruption of a virtual data block (VDB) providing indirection for file system data stored in corresponding physical data blocks (PDBs), the method including:
scanning PDB descriptors to identify PDBs storing file system data mapped by the corrupted VDB, each identified PDB including a set of PDB entries, each PDB entry having a corresponding backward pointer identifying a corresponding VDB entry of a corresponding VDB;
scanning the identified PDBs to identify PDB entries whose respective backward pointers refer to VDB entries of the corrupted VDB;
creating a replacement VDB by (1) for each of the identified PDB entries, recreating a corresponding VDB entry including a forward pointer to the identified PDB entry, and (2) incorporating the recreated VDB entries into the replacement VDB; and
incorporating the replacement VDB into the indirect addressing structure in place of the corrupted VDB.

12. The data storage system of claim 11, wherein the repairing method is initiated from normal operation in which a data storage system processes host I/O requests by writing/reading data to/from storage devices, the repairing method being initiated upon detection of the corruption of the VDB, the normal operation both using and maintaining the indirect addressing structure by, as PDBs are created or modified, adding the backward pointers to the PDB entries to identify the corresponding VDB entries.

13. The data storage system of claim 11, wherein the method performed by the processing circuitry is in support of data deduplication or data compression, data deduplication being supported by enabling multiple VDB entries to point to the same PDB entry, data compression being supported by each PDB entry containing a variable-length quantity of data resulting from compression by a compression algorithm of a standard-size fixed-length quantity of data.

14. The data storage system of claim 13, wherein the forward pointer of each VDB entry contains an offset and a length, the offset identifying the position of the associated PDB entry in the corresponding PDB, the length identifying the data size of the associated PDB entry.

15. The data storage system of claim 11, wherein the corrupted VDB and replacement VDB are arranged between the PDBs and a multi-layer indirect addressing structure that maps a large virtual address space of the file system to the data stored in the PDBs.

16. The data storage system of claim 15, wherein the corrupted VDB and replacement VDB are pointed to by respective leaf pages storing collections of indirect pointers at a lowest level of the multi-layer indirect addressing structure, and wherein selected leaf pages are pointed to by multiple higher-level mapping pages to realize block sharing for snapshot functionality.

17. The data storage system of claim 11, wherein the VDB entries also maintain reference counts of references from respective leaf pages, and the repair process includes recreating the reference counts for the corrupted VDB including scanning of the leaf pages to find all references to the VDB entries that correspond to the corrupted VDB.

18. The data storage system of claim 17, wherein the scanning of the leaf pages is done as a regulated background process to fix the reference counts of the corrupted VDB completely, and wherein, until the regulated background process is done, the replacement VDB is marked with a specific state to indicate its rebuilding process, and any normal-path accesses to the replacement VDB are prevented by checking the specific state.

19. The data storage system of claim 11, wherein the file system is part of a data storage system providing storage of a large number of logical storage objects presented to external host computers as storage volumes, and wherein the indirect addressing structure is used to map a large virtual space in which the storage objects are defined to corresponding sets of PDBs providing physical data storage.

20. The data storage system of claim 11, wherein the corresponding backward pointer of a given PDB entry is changed only when the data of the given PDB entry is moved to a different PDB as part of hole plugging or garbage collection operations, and wherein each VDB entry includes a sequence number used to identify a most up-to-date VDB, the sequence number being incremented whenever a VDB is updated to point to a different PDB.

\* \* \* \* \*